UNITED STATES PATENT OFFICE.

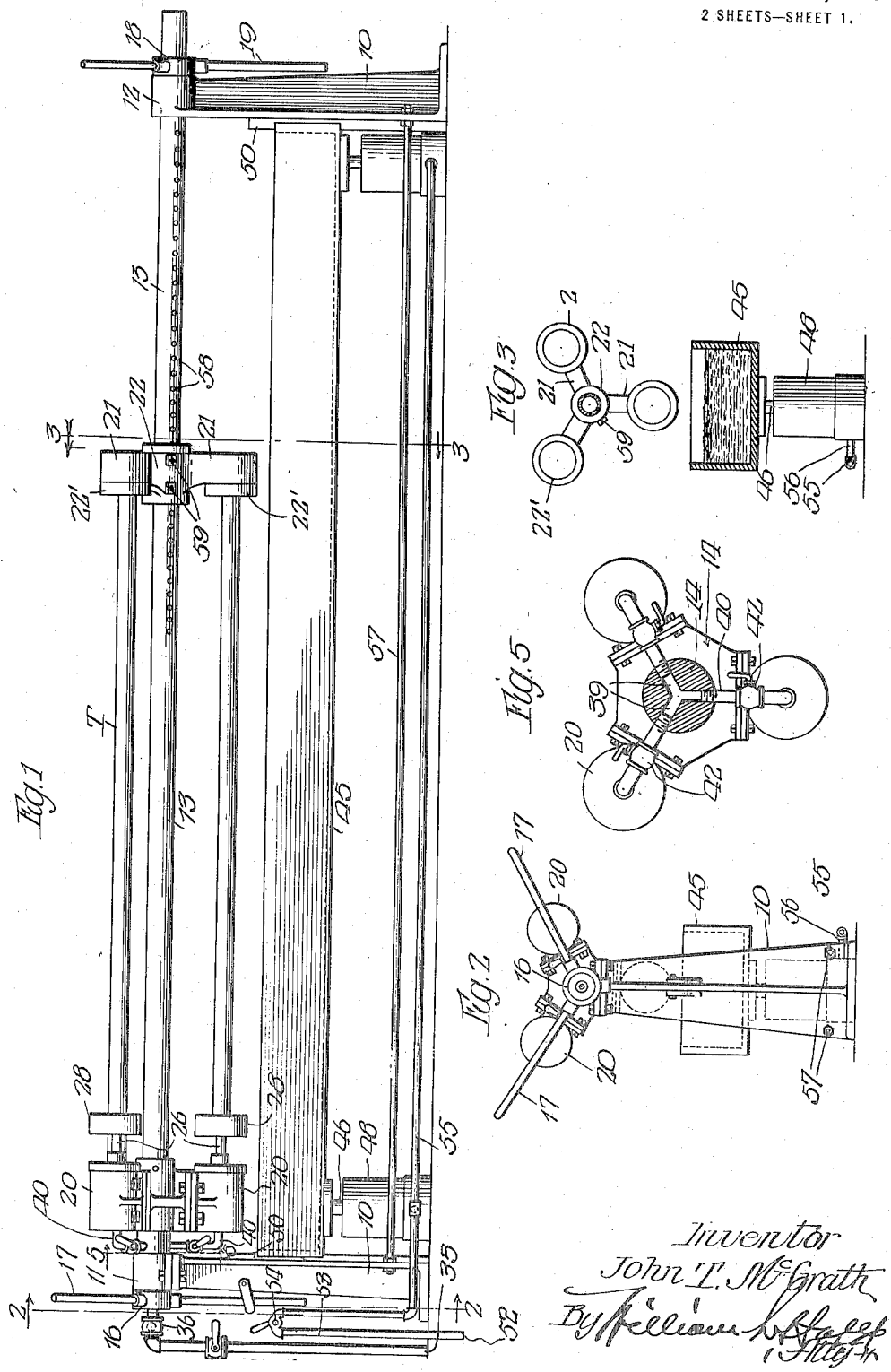

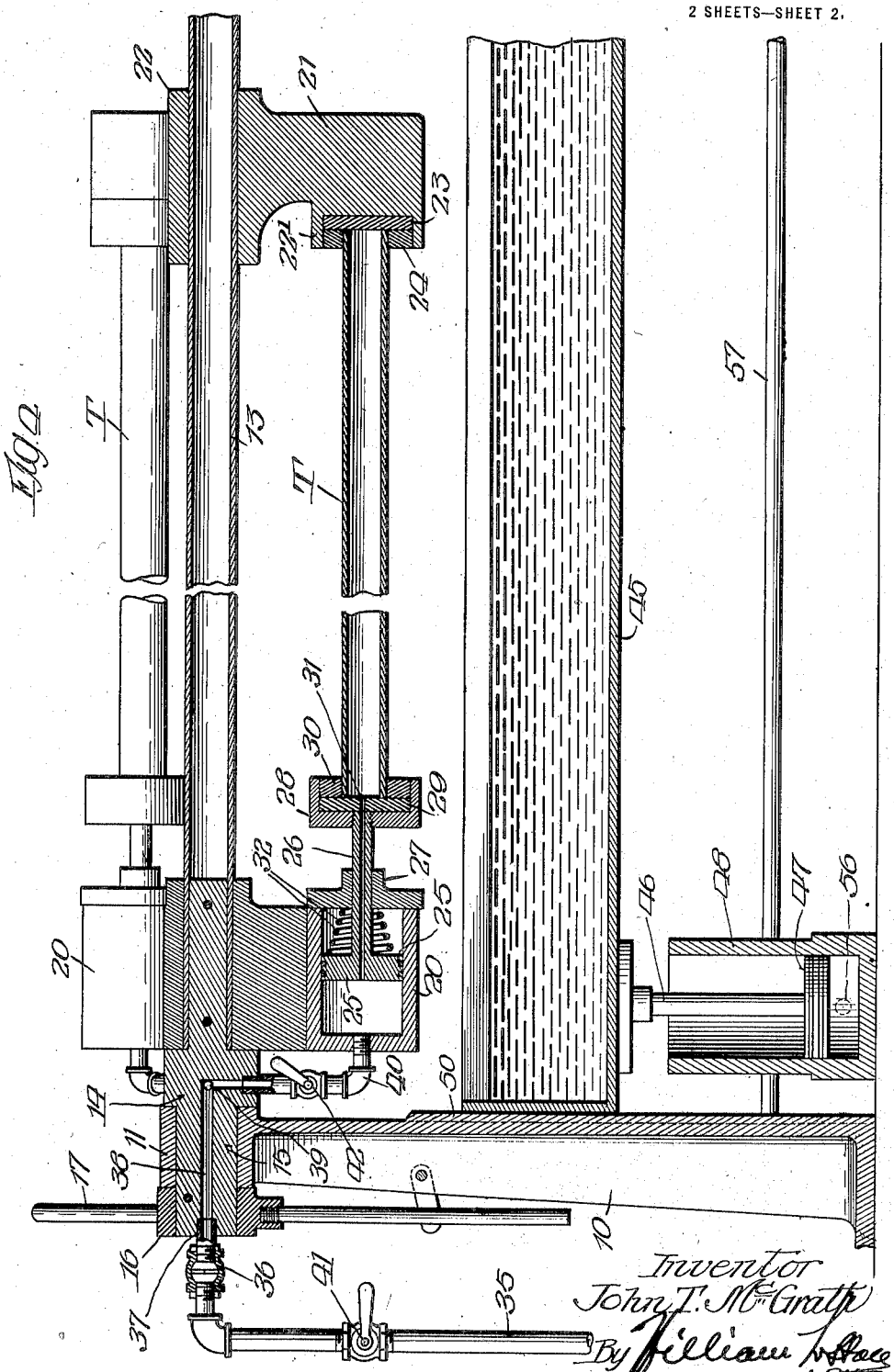

JOHN THOS. McGRATH, OF BLOOMINGTON, ILLINOIS.

TUBE-TESTING MACHINE.

1,325,747.  Specification of Letters Patent.  Patented Dec. 23, 1919.

Application filed July 8, 1918. Serial No. 243,833.

*To all whom it may concern:*

Be it known that I, JOHN T. McGRATH, a citizen of the United States, and a resident of Bloomington, in the county of McLean and State of Illinois, have invented certain new and useful Improvements in Tube-Testing Machines; and I do hereby declare that the following is a full, clear, and exact description thereof, reference being had to the accompanying drawings, and to the characters of reference marked thereon, which form a part of this specification.

This invention relates to improvements in tube testing machines, the purpose of which is to test tubes, such as boiler flues, or like hollow articles, to determine the presence and location of flaws in the tubes which would cause the same to leak under pressure.

The invention relates to that general type of machine wherein the tubes are charged with air or other gas under pressure and are submerged in a body of liquid, either before or after the tubes are charged with air, whereby air or other gas escaping from the tubes will be detected by the presence of bubbles of the liquid in which the tubes are submerged.

Among the objects of the invention is to provide a testing machine for this purpose, which is so constructed and arranged that a large number of tubes may be tested thereon in a given time.

A further object of the invention is to provide, in a testing machine of this general character, a rotating carrier in which the tubes or other articles to be tested are placed, said carrier being so constructed that when it is in position to present one tube or other article to be tested to the testing liquid, other tubes may be applied to and taken away from the carrier so that the tubes or other articles may be rapidly presented to and submerged in the testing liquid.

A further object of the invention, in a machine of this character, is to provide means for raising and lowering the testing liquid reservoir so as to present the body of liquid to a tube in position for testing.

Another object of the invention is to provide novel means for clamping the tubes or other devices to be tested between the clamping arm or arms of the carrier, constructed to seal the open ends of the tube against the escape of air therefrom.

Another object of the invention is to provide novel clamping means to support the tubes in the machine, arranged to be held in effective locking position by air pressure and to be released when air pressure in the tube is released.

Further objects of the invention are to improve and simplify tube testing machines, and the invention consists in the combination and arrangement of the parts shown in the drawings and described in the specification, and is pointed out in the appended claims.

In the drawings,—

Figure 1 is a side elevation of a tube testing machine embodying my invention.

Figs. 2 and 3 are vertical sections on the lines 2—2 and 3—3, respectively, of Fig. 1.

Fig. 4 is an enlarged partial vertical section of the machine.

Fig. 5 is a section on the line 5—5 of Fig. 1.

The frame of the machine comprises standards 10, 10, which are formed at their upper ends to provide bearings 11, 12, in which to receive the ends of a central supporting member 13 of the carrier, hereinafter described, said supporting member 13 comprising as its principal portion a tubular shaft which is rotatively supported in the bearing 12 of one of the standards 10. The other end of the shaft 13 is fitted in a distributing head 14 which is formed with a cylindric neck or shaft portion 15, axially alined with the tube 13, and which is rotatively mounted in the bearing 11 of one of the standards 10. Said neck or shaft portion 15 is extended beyond the bearing 11 to receive the hub 16 of a manual rotating device that is provided with radial arms 17 whereby the carrier may be rotated in its bearings. A second manual rotating device may be arranged at the other end of the machine, comprising a hub 18 that is mounted on an extended end of the tubular shaft 13 and provided with radial arms 19.

The said distributing head 14 also carries a plurality of cylinders 20, 20, the axes of which are parallel to the axis of the tube or hollow shaft 13. Said cylinders are angularly disposed about the axis of the head at equal distances apart.

21, 21 designate the radial arms of a spider whose hub 22 is fitted over the tubular shaft 13 (Fig. 3). Said arms are angularly spaced about the axis of the tubular shaft 13 to correspond with the angular spacing of the cylinders 20. Said arms are formed at their ends to provide sockets 22' to receive the ends of the tubes T to be tested. Said sockets are provided at their bottoms with packing disks 23 of any suitable compressible material, against which the ends of the tubes are fitted, and are further provided with compressible bushings 24 that fit closely within the walls of the sockets and against the outer faces of the packing disks 23. The openings in said bushings are of a size to closely receive the ends of the tubes T; and by providing a number of said bushings with different diameter openings, the machine may be adjusted to receive and test tubes of varying diameters.

Within the cylinders 20 are located reciprocating pistons 25 provided with hollow stems 26 which extend through suitable bearings or stuffing boxes 27 in the rear heads of said cylinders. The outer ends of said stems 26 carry other sockets 28, corresponding to the sockets 22', that are in like manner equipped with packing disks 29 and packing bushings 30 to respectively receive and seal the adjacent ends of the tubes. The packing disks 29 are provided with central apertures 31 in line with the bores of the hollow stems 26, thereby affording thoroughfares between the cylinder spaces in front of the pistons 25 and the interiors of the tubes T. Springs 32 are interposed between the rear heads of the cylinders and the pistons and act expansively to normally press the pistons 25 toward the front heads of the cylinders.

35 designates a pipe which is adapted to be connected with a source of air under pressure. Said pipe is connected through the medium of a suitable rotative joint 36 with a short pipe 37 that fits within the neck 15 of the distributing head and is in communication with an axial passage 38 in said neck. Said passage 38 communicates with three radial passages 39 formed in said head, and said radial passages communicate, through L-shaped branch pipes 40, with the cylinder spaces in front of the pistons 25 to afford thoroughfares for air from the axial passage 38 to the cylinder 20. The main supply pipe 35 is provided with a cut-off valve 41 and the branch pipes 40 are provided with like cut-off valves 42.

45 designates an elongated tank which is open at its top. It is located vertically below the tubular shaft 13 of the tube carrier. Said tank is supported at its ends on the upper ends of the rods or stems 46 of pistons 47 that are movable vertically in open-topped cylinders 48 which are supported in any suitable manner adjacent to the standards 10. The tank is guided in its vertical movement by means of guide ribs 50 on the inner sides of the standards 10 which engage vertical guide grooves on the outer faces of the end walls of the tank.

52 designates a pipe which is adapted to be connected with a source of air under pressure (preferably the same source with which said pipe 35 is connected). Said pipe extends upwardly alongside of the adjacent standard 10 at one end of the machine to form a loop 53, at the upper closed portion of which is located a controlling valve 54. The portion 55 of the pipe which communicates with the lower end of one of the legs of the loop extends horizontally from one end of the machine to the other and is provided with lateral branches 56 that enter the cylinders 48 near their lower ends to afford communication between the pipe 52 and the cylinder spaces below the pistons 47.

The supporting shaft 13 and its connected distributing head constitute means for the tying together of the upper ends of the standards. The lower ends of the standards may be tied or connected together by one or more tie rods 57.

The hub 22 of the spider which carries the rear ends of the tubes T is adapted to be adjusted longitudinally of the tubular shaft 13. For this purpose the hub of said spider is slidable on said shaft and the shaft is provided with a plurality of longitudinally spaced holes 58 to receive bolts 59 that extend through the tubular shaft whereby the spider may be locked in different positions of adjustment on the shaft. Thereby the machine is adapted to operate on tubes of varying lengths.

In the operation of the machine, a tube T is clamped between two opposing sockets 22', 28. The tube is set in place by first adjusting it to the rear socket 22', and at a time when the coacting socket 28 is drawn away from the socket 22' through the action of its spring 32. The tube is held in line with said socket 28 and air is admitted to the corresponding cylinder 20 by opening the proper valve 42, whereupon the pressure against the piston 25 acts to force the corresponding socket 28 toward and against the end of the tube. The carrier frame is then turned to bring the tube thus fitted thereto into line with the trough 45. Thereafter the trough 45 is raised by admitting air to the cylinders 56 through the pipe 55 until the tube so adjusted to the machine is submerged in the liquid. The air thus directed through the hollow piston stem 26 into the tube affords means to locate the presence and location of a fault in the tube, the bubbles leaking from the tube rising through the liquid. Therefore, by suitably marking the tube at the point or points where leakage of air therefrom is observed, the said tube when released from the machine may be readily repaired.

The tube is released, after inspection, by closing the associated valve 42, whereupon the spring 32, acting on the piston and its stem, withdraws the socket 28 from the tube. When a rotating carrier is employed, the trough will be lowered and the carrier turned to bring the tested tube away from the plane of the trough before releasing the same.

While one of the tubes is being thus tested another tube may be applied to the machine and clamped thereon between opposing sockets, so that it may, upon turning the carrier in the proper direction, be lowered in position to be submerged in the liquid in the said trough when the trough is again raised. By providing three or more co-acting clamping sockets one tube may be applied to the carrier at one side thereof while the other is being removed and at a time also when one of the tubes is being tested. Thereby the machine may be rapidly operated to test the tubes.

By thus manipulating the valves 42 and 54 air pressure is applied to hold the tubes clamped in the machine and to charge the tubes, and the tank 45 is raised and lowered at proper times between the periods of adjustment of the machine to present liquid to and withdraw it from the tube.

It will, of course, be understood that changes may be made in the structural details of the machine shown without departure from the spirit and scope of the invention and that the invention is not limited to such details except as to claims wherein the details are specified and as imposed by the prior art.

I claim as my invention:

1. A tube testing machine comprising a revoluble carrier provided with axially alined opposing clamping and tube end sealing sockets, means to admit air under pressure to a tube supported by the carrier between said sockets, a horizontal trough therebelow to contain a liquid, means to revolve said carrier, and other means for effecting relative vertical movement of the trough and carrier to submerge a tube supported by the carrier in the liquid.

2. A tube testing machine comprising a carrier provided with opposing clamping and sealing sockets, means to admit air under pressure to a tube supported by the carrier, a horizontal trough therebelow to contain a liquid, and means for moving said trough toward the carrier.

3. A tube testing machine comprising a carrier provided with opposing clamping and sealing sockets, means to admit air under pressure to a tube supported by the carrier, a horizontal trough therebelow to contain a liquid, and pneumatic means for effecting movement of said trough toward the carrier, embracing a valved pipe adapted for connection with a source of fluid supply under pressure.

4. A tube testing machine comprising a carrier provided with opposing clamping and sealing sockets, means to admit air under pressure to a tube supported by the carrier, a horizontal trough therebelow to contain a liquid, cylinders below said trough, pistons in said cylinders having means at their upper ends to support the trough thereon, and a valved pipe adapted for connection with a source of fluid under pressure having branches connected to said cylinders.

5. A tube testing machine comprising opposing clamping sockets, each equipped with tube end sealing means to seal the ends of the tube, means to admit air under pressure through one of said sockets to the tube, means whereby the testing air under pressure serves to force said sockets in clamping pressure against the tube ends, and means to submerge the tube in a liquid.

6. A tube testing machine comprising opposing clamping sockets, each equipped with tube end sealing means to seal the ends of the tube, means to admit air under pressure through one of said sockets to the tube, means whereby the testing air under pressure serves to force said sockets in clamping pressure against the tube ends, socket releasing means acting in opposition to said clamping means, and means to submerge the tube in a liquid.

7. A tube testing machine comprising opposing clamping sockets each equipped with tube end sealing means to seal the ends of the tube, one of said sockets being normally fixed and the other socket being movable toward and from the normally fixed socket and provided with an air passage, means for delivering testing air through said movable socket to the tube, combined with means for exerting force of said testing air to pneumatically clamp the socket members on the ends of the tube, and tube submerging means.

8. A tube testing machine comprising a carrier embracing clamping sockets, one of which is normally fixed and the other of which is movable toward and from the normally fixed socket and is formed with an air passage, a cylinder, a piston therein, a hollow piston stem to one end of which the latter socket is attached with its air passage in communication with the hollow piston stem, whereby when air under pressure is admitted to the cylinder in rear of the piston the force of air acting against the piston moves its associated socket into clamping position and also charges the tube, and tube submerging means.

9. A tube testing machine comprising opposing clamping sockets, each equipped with tube end sealing means to seal the end of the tube, one of said sockets being normally fixed and the other socket being movable toward and from the normally fixed socket and provided with an air passage, means for delivering testing air through said movable socket to the tube, combined with means for exerting force of said testing air to pneumatically clamp the socket members on the ends of the tube, socket releasing spring means operating in opposition to the clamping means, and tube submerging means.

10. A tube testing machine comprising a carrier embracing clamping sockets, one of which is normally fixed and the other of which is movable toward and from the normally fixed socket, yielding packing means in said sockets to seal the ends of a tube, a cylinder, a piston therein, a hollow piston stem, to one end of which one of said sockets is attached, whereby when air under pressure is admitted to the cylinder air passes through the piston stem and socket to the tube and the force of air acting against the piston moves its associated socket into clamping position, means to controllably admit air to said cylinder, a spring acting on said piston in opposition to its operating air pressure, a liquid trough below said carrier, and means for raising said trough toward and lowering it away from the carrier.

11. In a tube testing machine, the combination with a hollow tube receiving clamping socket having packing means therein to seal the end of a tube, a cylinder, a piston therein provided with a hollow stem communicating with the hollow socket, and with said cylinder and means to admit testing air to said cylinder against the piston and through the hollow piston stem to the clamping socket.

12. In a tube testing machine, the combination with a hollow tube receiving clamping socket having packing means therein to seal the end of a tube, a cylinder, a piston therein provided with a hollow stem communicating with the hollow socket, and with said cylinder means to admit testing air to said cylinder against the piston and through the hollow piston stem to the clamping socket, and a spring acting against said piston in opposition to the air pressure.

13. A tube testing machine comprising a rotative carrier having a plurality of pairs of clamping sockets between which the tubes are held, means to rotate said carrier to bring the tubes successively to the lower part of the machine, a trough below said carrier adapted to contain a liquid, means for effecting relative vertical movement of the carrier and trough to submerge the tubes in said liquid, and means for forcing air under pressure separately into said tubes.

14. A tube testing machine comprising a rotative carrier having a plurality of pairs of clamping sockets between which the tubes are held, means to rotate said carrier to bring the tubes successively to the lower part of the machine, a trough below said carrier adapted to contain a liquid, means for effecting relative vertical movement of the carrier and trough to submerge the tubes in said liquid, and means for forcing air under pressure separately into said tubes, combined with means operated by the force of the air under pressure to clamp said tubes in their sockets.

15. A tube testing machine comprising two upright standards provided with bearings, a carrier comprising a central shaft having bearing at one end in one of said standards, a distributing head having rotative bearing in the other standard and axially fixed to said shaft, a clamping socket spider fixed to said shaft and provided with a series of angularly spaced clamping sockets to receive the ends of the tubes, cylinders carried by the distributing head, pistons therein provided with piston stems which support other clamping sockets to coöperate with the first mentioned sockets, means for separately admitting air to said cylinders, means whereby air may be separately admitted to the tubes, an open top tank below said carrier, and means for effecting relative vertical movement of said tank and carrier.

16. A tube testing machine comprising two upright standards provided with bearings, a carrier comprising a central shaft having bearing at one end in one of said standards, a distributing head having rotative bearing in the other standard and axially fixed to said shaft, a clamping socket spider fixed to said shaft and provided with a series of angularly spaced clamping sockets to receive the ends of the tubes, means for adjusting said clamping socket spider along said shaft to adapt the machine to tubes of different lengths, cylinders carried by the distributing head, pistons therein provided with piston stems which support other clamping sockets to coöperate with the first mentioned sockets, means for separately admitting air to said cylinders, means whereby air may be separately admitted to the tubes, an open top tank below said carrier, and means for effecting relative vertical movement of said tank and carrier.

17. A tube testing machine comprising two upright standards provided with bearings, a carrier comprising a central shaft having bearing at one end in one of said standards, a distributing head having rotative bearing in the other standard and axially fixed to said shaft, a clamping socket spider fixed to said central shaft provided with a series of angularly spaced clamps to receive the ends of the tubes, cylinders carried by the distributing head, pistons therein provided with hollow piston rods which support and communicate with other clamps coöperating with the first mentioned clamps, means for separately admitting air to said cylinders and therethrough to the tubes whereby air pressure to charge the tubes acts against the pistons to effect clamping of the clamps on the tube ends, springs for releasing the clamps from the tubes when the air pressure is released, and tube submerging means.

18. A tube testing machine comprising a rotative carrier having a plurality of angularly spaced pairs of tube clamps, means to rotate the carrier to bring the tubes to a testing position, means for forcing air under pressure to said tubes, and tube submerging means.

In witness whereof I claim the foregoing as my invention, I hereunto append my signature at Bloomington, Illinois, this 26th day of June, 1918.

JOHN THOS. McGRATH.